US007624155B1

(12) United States Patent
Nordin et al.

(10) Patent No.: US 7,624,155 B1
(45) Date of Patent: *Nov. 24, 2009

(54) DATA REPLICATION FACILITY FOR DISTRIBUTED COMPUTING ENVIRONMENTS

(75) Inventors: Richard J. Nordin, Boston, MA (US); Andreas L. Bauer, Maynard, MA (US); Sriram Krishnan, Westborough, MA (US); Gregory W. Lazar, Upton, MA (US)

(73) Assignee: EMC Corporation, Hopkinton, MA (US)

( * ) Notice: Subject to any disclaimer, the term of this patent is extended or adjusted under 35 U.S.C. 154(b) by 346 days.

This patent is subject to a terminal disclaimer.

(21) Appl. No.: 11/360,270

(22) Filed: Feb. 23, 2006

Related U.S. Application Data

(63) Continuation of application No. 10/027,694, filed on Dec. 20, 2001, now Pat. No. 7,054,910.

(51) Int. Cl.
*G06F 15/16* (2006.01)
(52) U.S. Cl. .......................... 709/208; 714/6
(58) Field of Classification Search ......... 709/208–211; 714/6, 42, 15, 48
See application file for complete search history.

(56) References Cited

U.S. PATENT DOCUMENTS

| | | | | |
|---|---|---|---|---|
| 5,434,994 | A * | 7/1995 | Shaheen et al. | 709/223 |
| 5,935,207 | A * | 8/1999 | Logue et al. | 709/219 |
| 5,951,695 | A * | 9/1999 | Kolovson | 714/16 |
| 6,078,930 | A * | 6/2000 | Lee et al. | 707/202 |
| 6,147,967 | A * | 11/2000 | Ying et al. | 370/222 |
| 6,212,557 | B1 * | 4/2001 | Oran | 709/221 |
| 6,219,676 | B1 * | 4/2001 | Reiner | 707/201 |
| 6,367,029 | B1 * | 4/2002 | Mayhead et al. | 714/2 |
| 6,477,543 | B1 * | 11/2002 | Huang et al. | 707/200 |
| 6,567,893 | B1 * | 5/2003 | Challenger et al. | 711/118 |
| 6,633,538 | B1 * | 10/2003 | Tanaka et al. | 370/222 |
| 6,658,589 | B1 * | 12/2003 | Taylor | 714/6 |
| 6,757,698 | B2 * | 6/2004 | McBride et al. | 707/204 |
| 7,054,910 | B1 * | 5/2006 | Nordin et al. | 709/208 |
| 7,203,731 | B1 * | 4/2007 | Coates et al. | 709/214 |
| 2002/0032883 | A1 * | 3/2002 | Kampe et al. | 714/16 |

* cited by examiner

*Primary Examiner*—Krisna Lim
(74) *Attorney, Agent, or Firm*—Krishnendu Gupta; Robert Kevin Perkins; Joel Wall

(57) ABSTRACT

A data replication facility for distributed computing environments. A computer network having a plurality of network nodes utilizes a distributed directory provider service (DPS) having an established master node. The DPS supports a file replication service (FRS). The FRS establishes one of the nodes as originator node which receives new or updated files from one or more user/GUIs and/or from one or more software providers such as a security provider. The originator node in cooperation with the master node establish a backup copy of the new or updated file in the master node. Thereafter, the originator node publishes a File Version Variable (FVV) representation of the new or updated file to other network nodes (slave nodes) which obtain such file from the originator or, if need be, from the backup master node. Object observers are utilized to determine changes to the file version variables thereby triggering the downloading of new or updated files into the network nodes, whereby data file replication is accomplished throughout the network. In addition to avoiding a single point of failure, embodiments of the present invention also are network-topology independent. Additional syncing threads are employed as part of the file replication service to further ensure synchronization of the network nodes' data files within a predetermined interval, regardless of network failure modes. Embodiments of the present invention are particularly useful with networks of the client-server storage network variety.

46 Claims, 9 Drawing Sheets

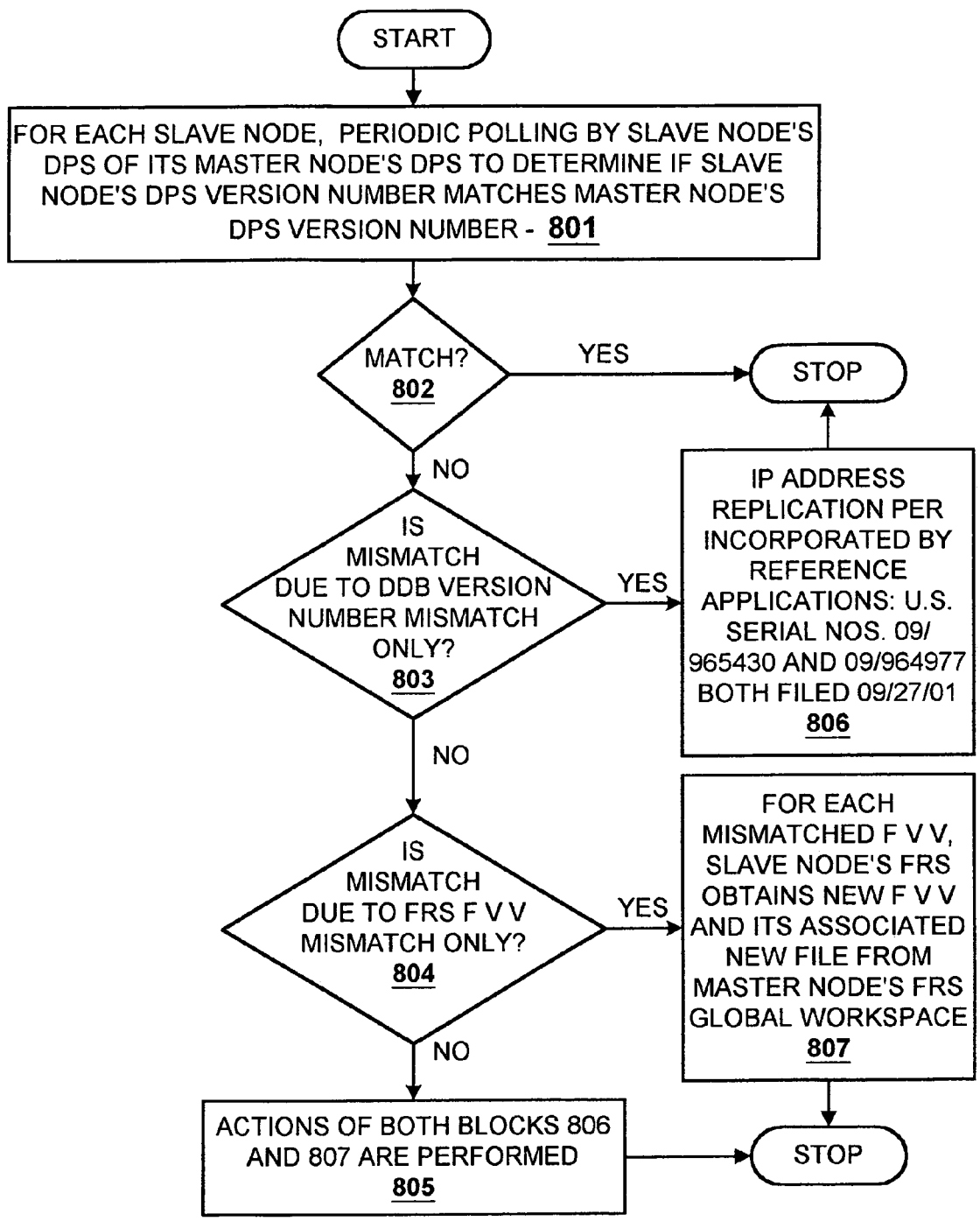
FIGURE 8 - RECOVERY ALGORITHM - FIRST SYNCING THREAD

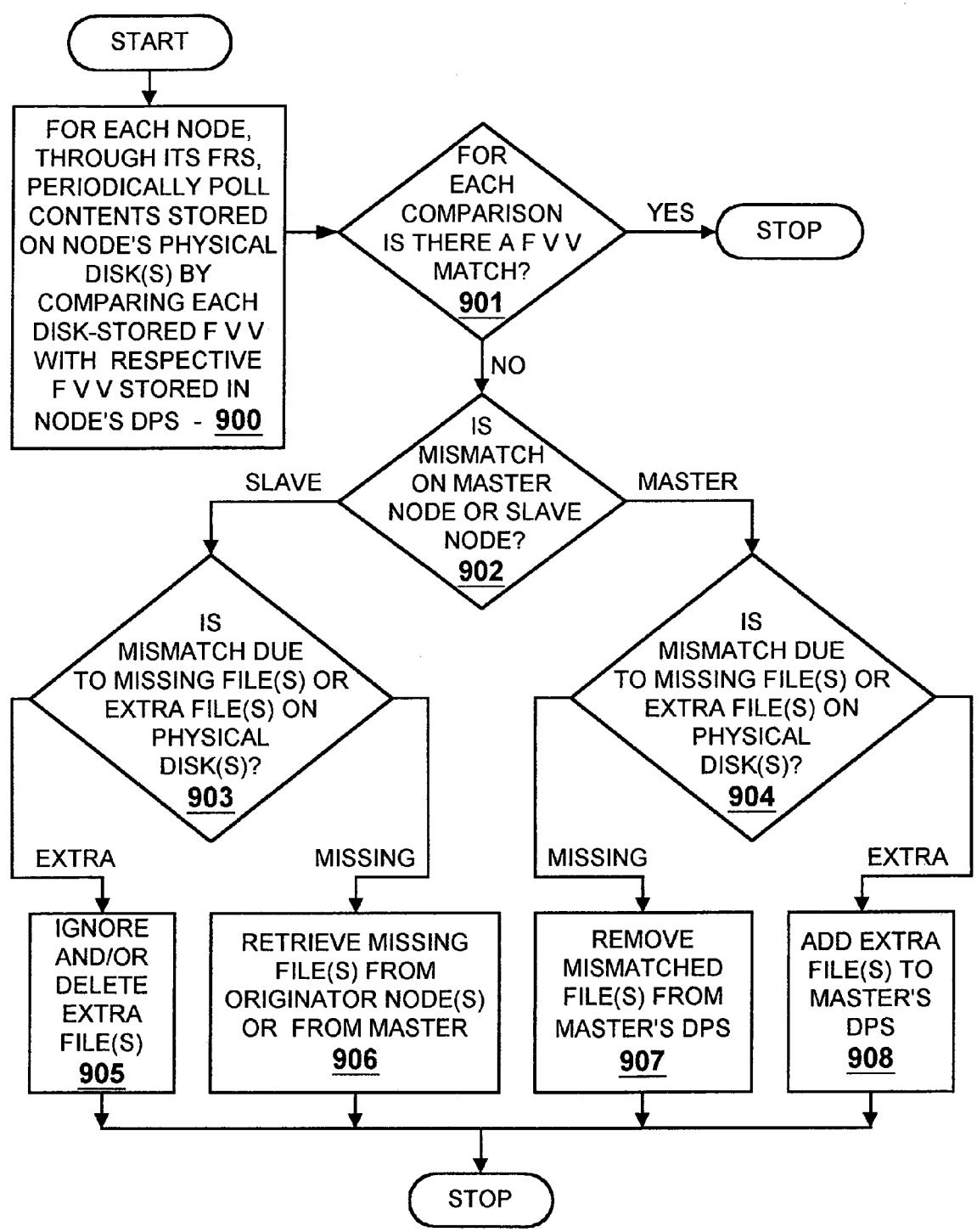
FIGURE 9 - RECOVERY ALGORITHM - SECOND SYNCING THREAD

DATA REPLICATION FACILITY FOR DISTRIBUTED COMPUTING ENVIRONMENTS

This patent application is a continuation application, filed under 37 C.F.R. § 1.53(b)(1), of prior non-provisional parent application Ser. No. 10/027,694, filed Dec. 20, 2001 now U.S. Pat. No. 7,054,910, entitled: "Data Replication Facility for Distributed Computing Environments." This patent application has the same inventors as those of the parent application, and has its assignee in common with that of the parent application. Benefits under Title 35 United States Code section 120 (35 U.S.C. § 120) are hereby claimed.

BACKGROUND OF THE INVENTION

1. Field of the Invention

The present invention relates to apparatus, methodology, systems, and/or computer program product for persisting or replicating data in a distributed computing environment and, more particularly, relates to a file replication service (FRS) which utilizes a directory provider that controls a directory data base (DDB) distributed throughout a client-server computer storage network in combination with both file version variable observers, also distributed throughout the network, and syncing threads utilizable by each node in the network.

2. Description of Prior Art

Computer networks are having an ever-increasing impact on modern-day lifestyle for many people, as the Internet, for example, is demonstrating. The Internet is supported by a technological infrastructure including other networks which can also be utilized in non-Internet environments. These other computer networks, for example client-server storage networks, may not be as well known to the general public as the Internet, but nevertheless can provide very important data storage and retrieval functions in a wide variety of applications (e.g. banking and finance, traffic control, medical research, military applications, routine business, etc.) to the overall benefit of society. In a client-server storage network, a human user of the network can be conceptualized as the "client" who is being "served" by the network. And, within such a network, inanimate hardware/software sub-systems that are being "served" in some capacity by other such sub-systems ("servers") are also referred to as "clients" of those servers.

A client-server network today may typically be based on an object oriented computer system that employs one or more object-oriented computer languages such as C++, XML (eXtensible Markup Language), JAVA, and/or others. Briefly, an object, in computer software terms, is a dedicated area of memory which can be thought of as an impervious container holding both data and instructions within itself, both defining itself and its relationships to other objects in the computer system or network. Such object or node can send and receive messages to and from other objects, respond and react to such messages (e.g. commands) but shall normally be impervious to internal scrutiny. For example, in a computer data storage system (a kind of computer) each object (system object) may describe or relate to a specific tangible detail in the storage system or in the storage system's processor (e.g., details such as those describing or relating to aspects of operation of the processor's cooling-fan, power switch, cache memory, power supply, disk drive interface, etc.). These tangible objects (nodes) in the storage system can send messages to each other within the storage system and to other objects outside the storage system over the network with which they are operatively coupled. Also, the storage system itself can be an object and interact as a node with other nodes in a network. Storage system or other kinds of objects that do not have special privileges relative to each other are sometimes termed "slave" nodes. By comparison, a "master" node can have certain leadership or control privileges or responsibilities relative to slave nodes in its network. Also, within the storage system, a segregated amount of data, or a file of data, or a data structure, or parts of the file such as a hash number or other data representation or tag such as a file version number, can also be thought of, and treated as an object.

In a client-server computer data storage network, its principal purpose is to store and retrieve data in an efficient, accurate and reliable manner under a wide variety of conditions imposed on the network. Under certain circumstances, particular data introduced to a storage network is to be stored not only on one of the network's nodes or storage systems, but is to be stored on all of them. For example, if there are a number of human users interacting with a network (possibly globally linked via the Internet) having storage system nodes located worldwide, it is important for each user to have a current list of all authorized network users. In this case, this security data needs to be stored on each network storage system node worldwide, and needs to be updated on all nodes if and when data changes (when a new user is added or prior user is dropped).

In the prior art, a technique for accomplishing storage of the same particular data on each of a number of network nodes is offered by Microsoft Inc. and is known as "Active Directory". Among other drawbacks and differences from the present invention, this offering requires the network's global administrator to specify network topology. This is normally a complicated, cumbersome, and time-consuming task of network topological configuration for the administrator to undertake. Other prior art offerings include, for example, the placing of a file server into the network or domain, where network nodes seek updated file copies from the file server but have drawbacks such as vulnerability to a single point of failure. In this instance, the data is kept in a centralized place, such as a shared directory, which therefore impacts all other nodes if and when the directory becomes inaccessible. Accordingly, if the single vulnerable link fails (file server failure or shared directory inaccessibility) the entire network cannot be updated and therefore fails catastrophically.

Thus, with respect to new or updated data files that are introduced into a client server network, there is a need for a service to replicate or duplicate certain of them in each storage system or node in the network in a manner that both avoids both topological constraints and single point of failure designs. Embodiments of the present invention satisfy this need and are welcome solutions to these problems and shortcomings of the prior art. Embodiments of the present invention include a Directory Provider Service (DPS) which controls, among other things, a Directory Data Base (DDB) distributed throughout a network as disclosed and claimed in two patent applications filed by the assignee of the present invention: "Managing a Distributed Directory Database", Krishnan et al, U.S. Ser. No. 09/965,430, filed Sep. 27, 2001 and "Resolving Multiple Master Node Conflict in a DDB", Krishnan et al, U.S. Ser. No. 09/964,977, filed Sep. 27, 2001, both of which are incorporated herein by reference in their respective entireties.

SUMMARY OF THE INVENTION

Embodiments of the present invention include apparatus, method, system, and/or computer program product for persisting or replicating data such as that in a datafile in a distributed computing environment. In one aspect of the present invention, a technique is provided for replicating a file in a computer network for use by a network user and having a plurality of nodes. A file is capable of being received from the user in any one of the nodes. In response to receiving the file in a certain one of the network nodes (the originator node), the file is replicated in all other nodes in the network. The file can be a new file or an updated file. The replication is performed in a manner that is network-topology independent and avoids a single point of failure.

In another aspect of the present invention, another of the nodes is established as a master node and the plurality of nodes except for the originator and master nodes are slave nodes. The updated file is stored on the master node as a backup file. In each of the slave nodes, a particular file is updated corresponding to the updated file, provided that the particular file does not contain contents identical to contents of the updated file. Creation of the backup file is communicated (a success note) to the originator node and availability of the backup file is communicated to the slave nodes. The originator node, responsive to the success note, publishes a representation of the updated file to all other nodes (slave nodes and master node). Each of the slave nodes respond to the published representation by obtaining the updated file from the originator node. If the updated file is not obtained from the originator node, it is obtained from the backup file in the master node. The originator node establishes an updated file version variable as the representation which gets published to the slave nodes. A particular file version variable corresponding to the particular file is established. Change from the particular file version variable to the updated file version variable is observed in each of the slave nodes, and responsive to each observation, the updated file is downloaded from the originator node into the particular file.

In yet another aspect of the present invention, the updated file is received in local workspace in the originator node. Global workspace is operatively coupled to the local workspace in the originator node and receives the updated file from the local workspace in preparation to download it to any of the slave nodes upon request therefrom. Further, in the master node, there is master node local workspace for receiving the updated file whereupon its file version variable is error-checked to confirm validity of the file version variable. Also, master node global workspace is adapted to receive the updated file from the master node local workspace and the updated file is transferred to the global workspace if the validity of the file version variable is confirmed. Responsive to transfer of the updated file into the master global workspace the creation of the backup file is communicated to the originator node and the availability of the backup file is communicated to the slave nodes. If the validity of the file version variable is not confirmed by error-checking, an error is flagged, operation of the file replication procedure is stopped with respect to the file having the invalid file version variable, and the present file replication invention is prepared to receive a next successive updated file.

However, the file replication procedure may continue with respect to other files previously received by the same originator which received the invalid file version variable or previously received by other originators within the network. It should be understood that the updated file could be supplied by any one of multiple sources such as a human network user or other non-human software providers such as a security provider. It should also be understood that more than one new file can be received from these sources seriatim and replicated. (The terms "updated file" and "new file" can be used interchangeably herein, since an "updated" file contains "new" data compared to its prior file version; however, a "new file" can also refer to a file that had no prior existence.) It should be yet further understood that when the network is interacting with multiple users concurrently, each of whom selects a different network node to be its originator node, that multiple operations can take place simultaneously whereby a given node can simultaneously be both originator node with respect to a first user while being a slave node with respect to a second user. Thus, there can be multiple originator nodes at any given point in time, each originator node relating to or characterizing a different independent network scenario within the same network. However, the node selected as master node is master for all originator nodes and all slave nodes at any given point in time, and there can be only one master node at any given point in time.

In yet another aspect of the present invention, to ensure replication if any of the foregoing operation fails to achieve satisfactory file replication, a first syncing thread is applied. Each of the slave nodes periodically polls the master node to determine if the slave node's particular file contents matches the updated file contents stored as backup in the master node. If there is no match, the particular and updated file contents are synchronized. A Directory Provider Service (DPS) version number is established to identify the current version of the DPS in the network. A Directory Data Base (DDB) version number is established to identify the current version of the DDB in the network. The DPS version number on each of the slave nodes is compared with the DPS version number on the master node to obtain a respective DPS version number match. If there is a match for each of certain of the slave nodes, further synchronizing operation with respect to the current poll by each certain slave node is terminated. For the remainder of the slave nodes, where a DPS version number match was not obtained, a DDB version number match is achieved. In addition, for the remainder of the slave nodes, the particular file version variable on each of the remainder is compared with the updated file version variable on the master node to obtain a respective file version variable match. If a file version variable match is obtained for a portion of the remainder of the slave nodes, further synchronizing operation with respect to the current poll by each of the slave nodes in the portion of the remainder is terminated. And, for each slave node in the remaining portion of the remainder of slave nodes for which a file version variable match was not obtained, such a match is achieved. Thereby, the particular file contents matches the updated file contents in each of the slave nodes.

As earlier noted, a particular node can be in the position of being a slave node with respect to multiple originator nodes, where each originator node relates to a different independent network scenario within the same network at the same time. Therefore, that particular slave node needs to ensure synchronization with respect to each new or updated file associated with each originator node. Accordingly, the foregoing polling is undertaken by each slave node of the sole master node with respect to each of that slave node's originator nodes. The global administrator can configure the interval duration of polling operations for the entire network. The interval duration will be the same for each node in the network, but each node's interval may be offset from the other nodes' intervals. In other words, each node's interval may have a different starting time, but must have the same duration. A typical interval duration may be configured by the global administrator to be approximately five minutes.

In yet another aspect of the present invention, each of the plurality of nodes is a storage system having storage media such as storage disk(s) on which both the particular file version variable and the particular file contents are stored and a second syncing thread is applied. The particular file version variable stored on the media in each of the nodes is compared, through periodic polling, with the particular file version variable stored elsewhere in the respective node to determine a particular file version variable match for each of the nodes. For certain of the nodes for which such match was not achieved, the two file version variables are synchronized and the particular file version variable match is achieved for each of the certain nodes. Synchronization is accomplished differently as a function of the cause of mismatch. The mismatch can result from extra files on disks or missing files on disks as compared to files on the node. Synchronization is also accomplished differently for master node file version variable mismatch as compared with other nodes. This additional periodic polling of the second syncing thread can take place at five minute intervals, but is not restricted to any particular interval. This additional periodic polling need not be coincident with the FRS/DDB polling of the first syncing thread described earlier.

It is thus advantageous to utilize embodiments of the present invention in computer networks, such as computer storage networks, where data replication throughout the network is necessary or desirable. Accordingly, such data replication is achieved in a manner that avoids configuring the network in accordance with a particular topology, and in a manner to avoid a single point of failure since backup is provided as well as syncing threads.

It is thus a general object of the present invention to provide an improved computer network.

It is another general object of the present invention to provide an improved data replication facility for distributed computing environments.

It is yet another object of the present invention to provide a technique for replicating data files in a network that is topology-independent and avoids a single point of failure.

It is still another object of the present invention to provide an improved computer data storage network which utilizes a distributed File Replication Service based on at least a distributed Directory Provider Service.

Other objects and advantages will be understood after referring to the detailed description of the preferred embodiments and to the appended drawings wherein:

BRIEF DESCRIPTION OF THE DRAWINGS

FIG. 8 is a flowchart depicting a first syncing thread of a recovery algorithm which is also utilized in FIG. 7; and, FIG. 9 is a flowchart depicting a second syncing thread of a recovery algorithm which is also utilized in FIG. 7.

DESCRIPTION OF THE PREFERRED EMBODIMENTS

Figure 1:
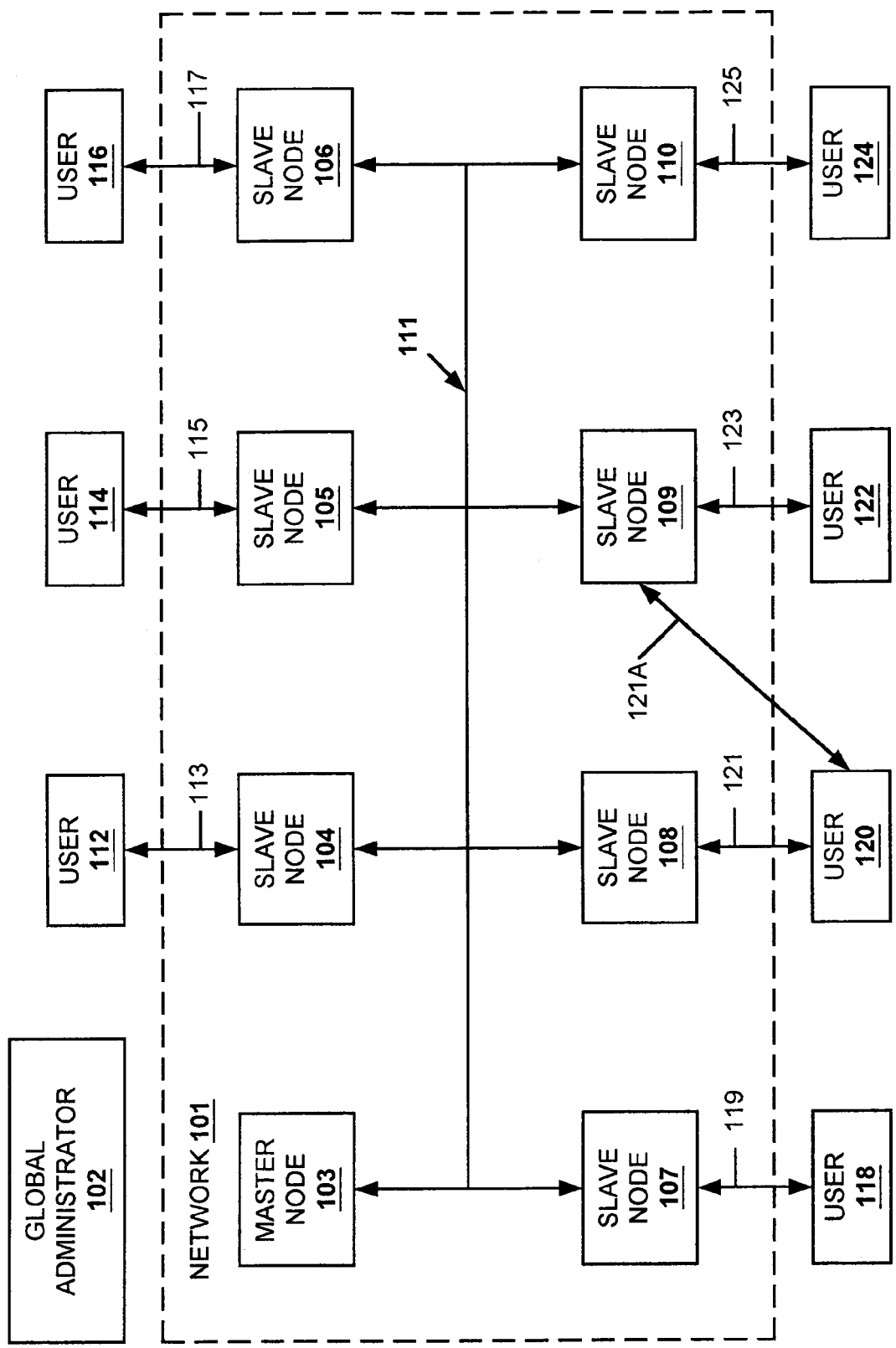
FIG. 1 is a schematic block diagram of computer network of the type in which embodiments of the present invention can be particularly advantageous.

FIG. 1—Network Overview

Referring to FIG. 1, there is depicted a schematic block diagram of a computer network of the type in which embodiments of the present invention can be particularly advantageous. This network can represent a computer data storage network, or can represent another type of client-server network. Network 101, as a computer data storage network, includes master node 103 and slave nodes 104-110 which are all operatively and communicatively inter-coupled by way of bus structure 111. Each slave node is shown to be communicatively linked to a (human) user: slave node 104 is coupled to user 112 via bidirectional link 113; node 105 is coupled to user 114 via link 115; node 106 is coupled to user 116 via link 117; node 107 is coupled to user 118 via link 119; node 108 is coupled to user 120 via link 121; node 109 is coupled to user 122 via link 123; and node 110 is coupled to user 124 via link 125. Node 109 is also shown communicatively linked to user 120 via link 121A while also being coupled to user 122, more discussion of which shall be presented hereinbelow. In the upper left hand corner of the diagram is global administrator 102, a user having special privileges as compared with the other users shown. The global administrator is communicatively coupled to every node in the network, including the master node, but these connections are not shown for purposes of enhancing clarity of presentation. The global administrator is the only user who can establish or change the master node, and is further described in the incorporated by reference patent applications.

Nodes 104-110 are labeled "slave" nodes to distinguish them from "master" node 103 (master and slave nodes are defined in the incorporated by reference patent applications). However, since each slave node is shown in communication with at least one user, then each slave node can be in receipt of a new data file or updated data file forwarded to it by its respective user (in the vernacular: "the new data file is dropped on the node"). Any slave node receiving a new or updated data file from its user is re-defined herein as an "originator node" with respect to that new or updated data file being dropped on it. In a first scenario, for example, if user 114, by way of a graphical user interface (GUI—not shown) through which the user communicates with node 105, drops a new file on node 105, then node 105 becomes the originator node with respect to that particular new file for the rest of the network. In this scenario, the network node status is: master node 103 retains its master status, and slave nodes 104 and 106-110 each retains its respective slave status with respect to that new particular file. This network node status would also apply to any successive new files forwarded to node 105 by user However, in a second scenario, a different network node status would result if a different user, for example user 116, were to drop a different new file on slave node 106. In this second scenario, slave node 106 then becomes originator node for this different new file with respect to the same master node 103, and nodes 104, 105, and 107-110 are slave nodes with respect to originator node 106. These two different scenarios can occur simultaneously, where a particular slave node can be both a slave node with respect to a particular data file and an originator node with respect to a different data file at the same time. The number of these different scenarios can grow with the total number of nodes and users involved in the network, where all new data file operations from all users on all slave nodes can occur simultaneously in the manner just described.

User 120 is communicatively coupled to both slave node 108 via link 121 and slave node 109 via link 121A. This illustrates the fact that a user can be concurrently coupled to more than one node. As a network of storage systems, this shows a user being coupled to more than one storage system at the same time. In this case, storage system 108 becomes originator node for the network with respect to a new data file supplied to it by user 120, while storage system 109 becomes originator node for the network with respect to a different new data file supplied to it by the same user 120. Further detail regarding construction and operation of this network, by which replication (duplication) of these new data files is achieved throughout the network, is presented hereinbelow in connection with other Figures.

Figure 2:
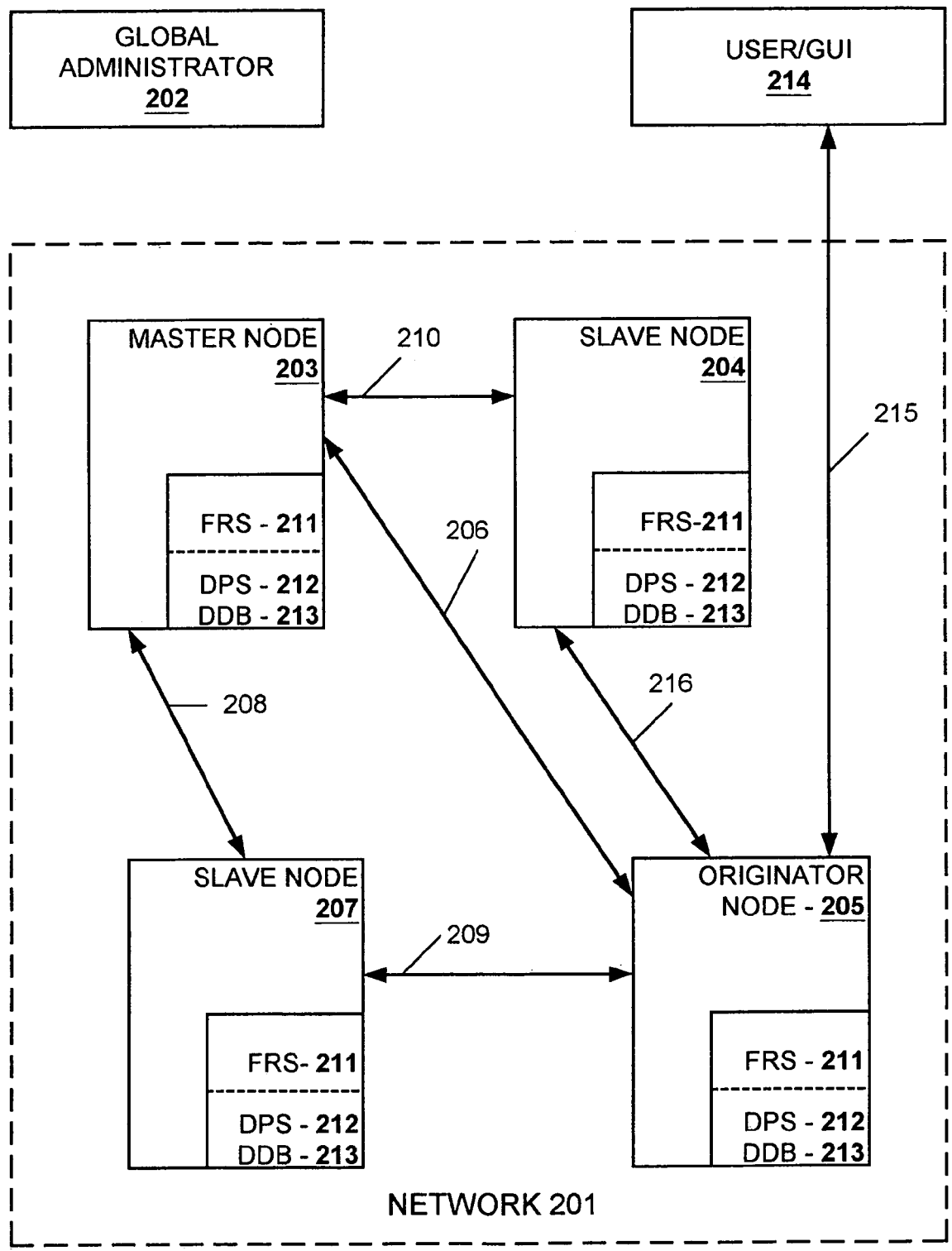
FIG. 2 is a more detailed block diagram of a computer network of the type shown in FIG. 1, showing FRS and DPS functionality in each network node.
Figure 3:
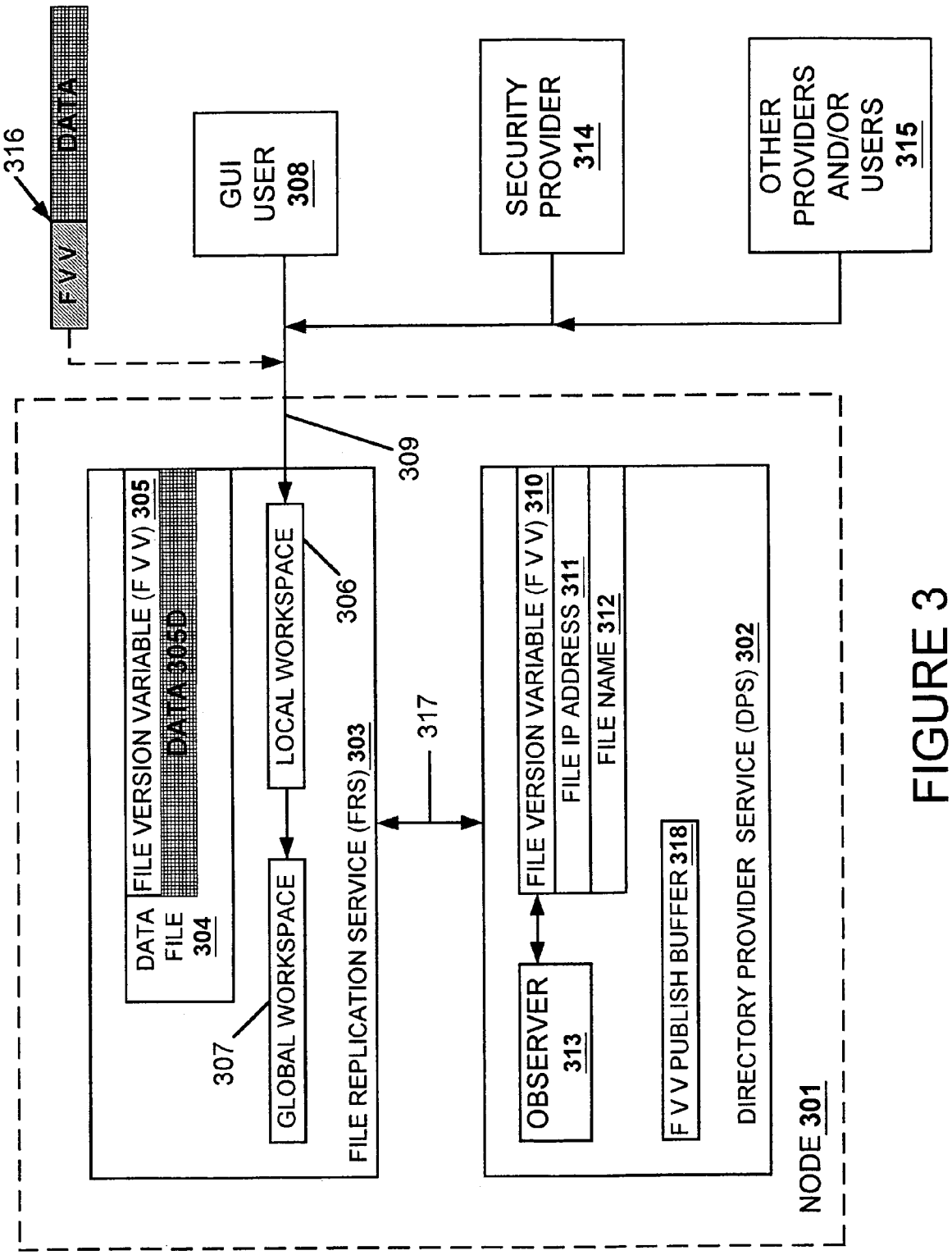
FIG. 3 is a further detailed schematic block diagram of a node of the type displayed in FIG. 2 showing structure internal to FRS and DPS functionality and the various clients which network nodes of this type can serve.

FIGS. 2 & 3—Operational Overview

FIG. 2 may be a more detailed block diagram of a portion of the network of FIG. Therefore, network 201 may correspond to a portion of network 101; master node 203 may correspond to master node 103; user/GUI 214 may correspond to user 114; originator node 205 may correspond to originator/slave node 105; slave nodes 204 and 207 may correspond to slave nodes 104 and 107 respectively; global administrator 202 may correspond to network administrator 102; interconnecting link 215 may correspond to link 115; and inter-nodal direct links 210, 206, 208, 216, and 209 may collectively correspond to a portion of bus 11.

A File Replication Service (FRS) and a Directory Provider Service (DPS) are depicted as being distributed throughout network 201 and reside in each node of network 201 as FRS 211 and DPS 212. (Other services and functionality included within these nodes, for example, storage processors and disk drives for nodes which comprise a storage system, are not shown in order to enhance clarity of presentation.) FRS 211 is dependent upon or runs on DPS 201 and the contiguous juxtaposition of blocks representing these two services is intended to suggest this operational relationship. Within each DPS 212 is depicted a directory data base, DDB 213, which has been described in detail in the incorporated by reference patent applications.

By way of an introductory overview of network operation, one may assume that global administrator 202 had selected node 203 to be the network's master node. Selection of the master node, and communication of the selection to network nodes, are described in the incorporated by reference patent applications. User 214, through its GUI which is similar to the graphical user interface described in the incorporated by reference patent applications, "drops" a new file on slave node 205 thus making it the originator node for user 214 in network 201. Originator node 205, through its FRS 211 communicates with FRS 211 in master node 203 over link 206, to advise the master node of this newly arrived data file from user 214. If certain characteristics of this new data file are acceptable to master node 203 (detailed below) it will retain a copy of the contents of such file for backup purposes. The retention of the file for these purposes is communicated back to FRS 211 in originator node 205 which then causes its DPS 212 to "publish" a representation of the new file to all slave nodes in the network, namely nodes 204 and 207 in this example. In other words, DPS 212 in originator node 205 sends a new file representation (termed a "file version variable" or FVV) to all slave nodes in the network. In this instance the FVV is sent to both DPS 212 in slave node 204 over link 216 and DPS 212 in slave node 207 over link 209, advising both slave nodes of a new data file being introduced into the network. Through a manipulation within each slave node to be discussed below, FRS 211 of slave node 204 and FRS 211 of slave node 207 each obtains the new data file from FRS 211 of originator node 205 over links 216 and 209 respectively. If not obtainable from the originator node by either or both slave nodes, the new data file is obtained from the backup copy retained in master node 203 over links 210 and 208 respectively. In addition, there is periodic synchronizing (syncing) undertaken by each slave node with the master node over links 210 and 208 which brings any data files up-to-date that might have remained outdated for any reason, even if the slave nodes had sought a new data file from the master node's backup copy.

Referring next to FIG. 3, there is provided a further detailed schematic block diagram of a node of the type displayed in FIG. 2. It shows functionality internal to FRS and DPS services used for manipulating data files and their representations, and shows various clients served by network nodes of this type. FRS 303 and DPS 302 are shown within node 301 and are operatively intercoupled by bidirectional link 317.

FRS 303 includes data file 304, local workspace 306 and global workspace 307 functionality, some of which may be used by the node when functioning as a slave node and other of which may be used by the node when functioning as originator or master node. When functioning as originator or master node, local workspace 306 and global workspace 307 are operational. When functioning as slave node, data file 304, including its data structure (FVV 305 and data 305D), are operational.

DPS 302 includes file name 312, file IP address 311, FVV 310, observer object 313, and FVV publish buffer 318 functionality, some of which may be used by the node when functioning as a slave node and other of which may be used by the node when functioning as originator or master node. When functioning as originator node, publish buffer 318 is operational. When functioning as slave node, file name 312, file IP address 311, FVV 310, and observer object 313 are operational.

An observer is a software object which is fixated on another object, and it has the capability of triggering, or transmitting a signal, simultaneously with any change in that other object. In various embodiments of the present invention, an observer can fixate onto an object which holds an old file version variable which changes to an updated file version variable when an old file is updated, and the same or another observer can fixate onto another object which reflects a new file version variable upon occurrence of a new file being added to the network. "Updated file version variables" and "new file version variables" are terms that may be used interchangeably herein. It should be understood that other functionality (not shown) may be included in both FRS 303 and DPS 302.

When node 301 is operating as an originator node, local workspace 306 receives data structure(s) 316 which has an FVV header and a data load portion as shown. The data structure(s) can be supplied by a number of suppliers: GUI user 308 as discussed, security provider software 314, and/or other software provider and/or users 315. Local workspace 306 holds the FVV and its associated data load as an input buffer. Part of the data structure in the buffer is first manipulated and tested before it is permitted to feed global workspace 307 as shown. Detail regarding this manipulation and testing, which involves the master node, is provided in connection with FIG. 4. Once transferred to global workspace 307, however, the data structure is then available for downloading to slave nodes in a manner that provides the actual data file replication to the slave nodes. DPS 302 is readied by FRS 303 via link 317 to broadcast or publish (as the originator node) from FVV publish buffer 318 the FVV portion of the updated data structure as well as the updated file's name and IP address to all of the slave nodes. The slave nodes manipulate the published FVV, described below, after which the originator node's global workspace 307 is accessed and read by the slave nodes, whereby downloading of the data load takes place resulting in actual data file replication to the slave nodes.

By contrast, when node 301 is operating as a slave node, the local and global workspaces are not used in FRS 303 and FVV publish buffer 318 is not used in DPS 302. Rather, when operating as a slave node, a prior version of a data structure such as representation FVV 305 and its corresponding data 305D comprise data file 304 stored in FRS 303. Any update to that data structure is observed by observer 313 while fixated upon the FVV 305 object which becomes file version variable FVV 310, in response to the originator node's publishing that updated file version variable along with its file name and IP address as described above. This causes slave node 301 to make a comparison between FVV 310 and FVV 305 which do not match. The mismatch results in slave node 301 seeking the updated file with file name 312 at IP address 311 that corresponds to FVV 310. The updated file is first sought from the originator node, and, failing that is next sought from the master node which is holding the updated file as backup. This overview discussion of operation is detailed further in connection with discussion of FIGS. 4-9 hereinbelow.

Figure 4:
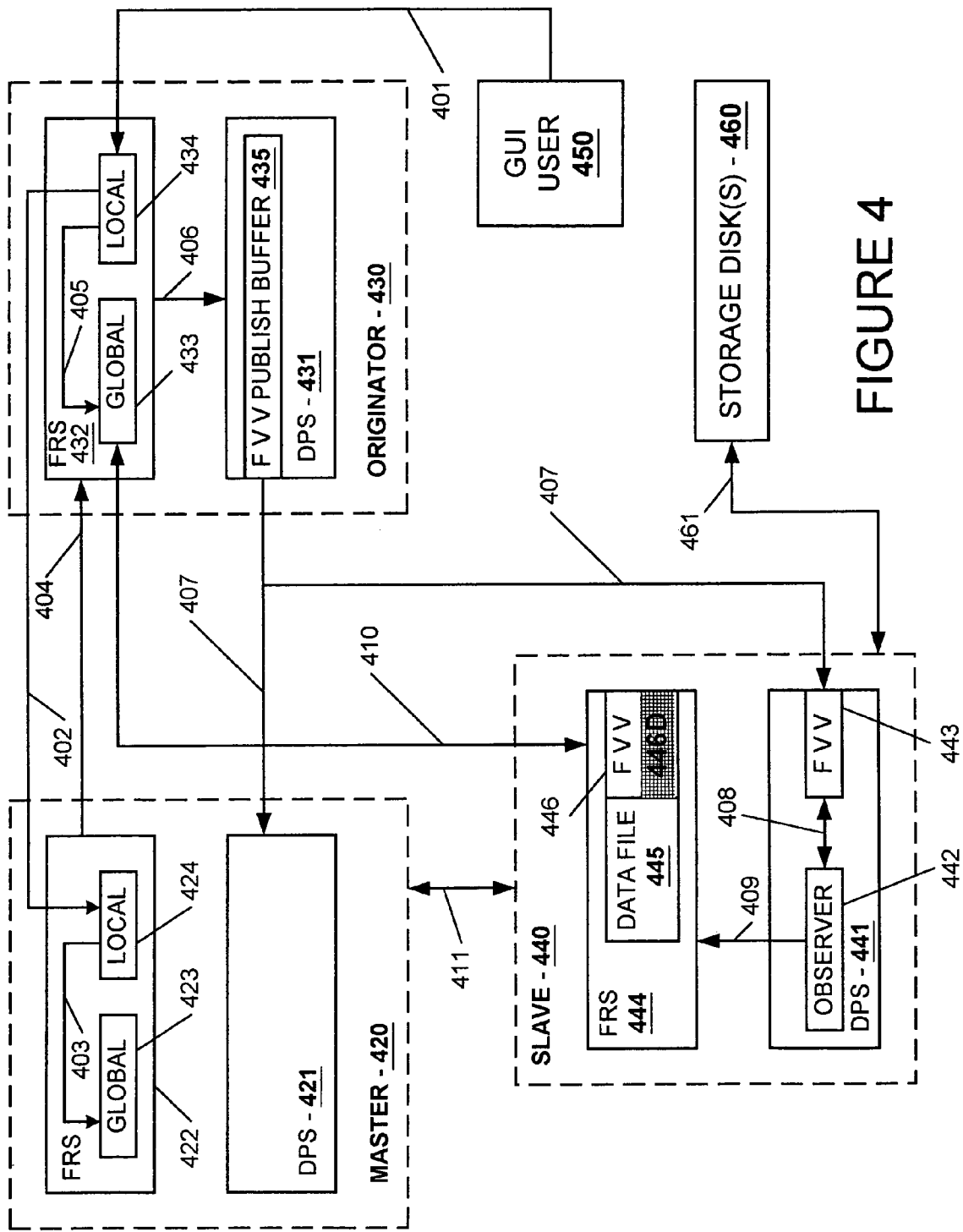
FIG. 4 is a schematic block diagram showing a network's master, slave, and originator nodes and their interrelated functionality when operating to receive a new or updated file from a user client and to update the slave node's corresponding file in accordance with principles of the present invention.

FIG. 4—Detailed Description

FIG. 4 is a schematic block diagram showing a network's master, slave, and originator nodes and their interrelated functionality when cooperating to receive a new file from a user client and update the slave node's corresponding file in accordance with principles of the present invention. In the upper left hand section of the diagram is master node 420 including its DPS 421 and FRS 422 which, in turn, includes global workspace 423 and local workspace 424. In the upper right hand section of the diagram is originator node 430 including its DPS 431 which, in turn, includes FVV publish buffer 435. Originator node 430 further includes its FRS 432 which, in turn, includes global workspace 433 and local workspace 434. In the lower left hand section of the diagram is slave node 440 including its DPS 441 which, in turn, includes observer object 442 and FVV 443. Slave node 440 further includes its FRS 444 which, in turn, includes data file 445 with its corresponding FVV 446 and data 446D. In the lower right hand section of the diagram disk storage component 460 and GUI user 450 are shown. These nodes, components and interfaces are operatively coupled as shown and to be described in detail hereinbelow.

As noted earlier, these nodes can be physically very similar to each other, if not identical. However, in FIG. 4, only functionality which is operative in a node is shown in that node. Functionality which is not operative in that node is intentionally not shown in that node, to enhance clarity of presentation. Furthermore, and as earlier noted, there can be yet additional functionality included in any particular one or more of these nodes which may be essential or desirable for overall functioning of that node within a storage network or other operational environment. However, such additional functionality would be irrelevant to operation of embodiments of the present invention and therefore is not shown herein.

In operation, GUI user 450 decides to update an existing data file in a network of the type shown in FIG. 1 and, in accordance with our nomenclature, drops a new or updated file on local workspace 434 in originator node 430 via external communication link 401. External communication links conform to Transmission Control Protocol/Internet Protocol (TCP/IP), the suite of communication protocols used to connect computer systems on the Internet. In a preferred embodiment, these links can conform to the Ethernet LAN architecture, or versions thereof. This new file is identical in format to that which contained data structure 316 depicted in FIG. 3, having both a FVV and a data load. Local workspace 434 is similar to a "scratch pad" memory or a "clipboard" memory and serves as a temporary storage for the new file while other important functions are undertaken before arranging for the new file to be more permanently stored. Local workspace 434 transmits the new file via network communication link 402 (the network communication link is a compatible Ethernet bus) to local workspace 424 (which may be similar or identical in functionality to local workspace 434) located in master node 420. This transmission takes the form of an XML language request, which is a textual way of representing objects. On the receiving end of this transmission in the master node, a parser (not shown) of this XML request, which determines what sort of object was received, has special characters used for calibration. Since a binary file could have those same special characters in it, the binary file could be problematic for an XML parser which could mistake those embedded special characters as calibration characters. Therefore, to transmit a binary file, a conversion from binary to XML is needed and 64 bit encoding can be used. The encoded binary file is wrapped inside XML code so that the master node's parser receiving the encoded file into local workspace 424 can understand what it is receiving. The lines of code for a typical encoded binary file wrapped in XML for handling this transmission can be similar to that shown in Table I.

TABLE I

NEW DATA FILE AS XML-WRAPPED BINARY CODE

```
<?xml version="1.0" ?>
<CIM CIMVERSION="2.0" DTDVERSION="2.0" >
<MESSAGE ID="877" PROTOCOLVERSION="1.0" >
<SIMPLEREQ>
<METHODCALL NAME="UploadFile" >
<LOCALNAMESPACEPATH><NAMESPACE NAME=
"root" /><NAMESPACE NAME="e" />
<NAMESPACE NAME="navisphere" /></LOCALNAMESPACEPATH>
<PARAMVALUE NAME="InstanceName" >
<INSTANCEPATH>.<NAMESPACEPATH>
<HOST 127.0.0.1/>.<LOCALNAMESPACEPATH>
<NAMESPACE root/>.<NAMESPACE e/>.<NAMESPACE n/>
</LOCALNAMESPACEPATH>.</NAMESPACEPATH>.<INSTANCE-
NAME CLASSNAME="AAA">.
<KEYBINDING NAME="uniqueKey"><KEYVALUE
VALUETYPE="string">BBB</KEYVALUE>
</KEYBINDING></INSTANCENAME>.</INSTANCE-
PATH>.</PARAMVALUE>
<PARAMVALUE NAME="FileName" Type="string">
<VALUE>notes.txt/VALUE></PARAMVALUE>
<PARAMVALUE NAME="Buffer"
Type="string"><VALUE>ABCDEF</VALUE>.</PARAMVALUE>
<PARAMVALUE NAME="BufferSize"
Type="string"><VALUE>6</VALUE>.</PARAMVALUE>
<PARAMVALUE NAME="NeedToRegister"
Type="boolean"><VALUE>true</VALUE>.</PARAMVALUE>
</METHODCALL>.</SIMPLEREQ>.</MESSAGE>.</CIM>
```

Upon receipt of this new file in its local workspace, master node 420 first performs an error checking operation on the FVV portion of the new file. In this operation, the master node determines if the new file's FVV is valid. In other words, the master node queries: does this FVV make sense compared with other FVV numbers with which it has familiarity? Or, is this FVV garbled or otherwise unusable? The master node needs to assure itself that it can retrieve this new data file based on this FVV if it is required to do so, and needs to examine this FVV for this purpose in advance of permanently accepting the data file. (Since the user can save any type of data in this file the master node cannot verify substantive data for correctness—it can only examine the header FVV number for "reasonableness" relative to other FVV numbers.) If the FVV does not pass the error check, the operation stops, the master node flushes the new file from its local workspace, and an error flag is returned to the user's GUI. The user can try again later or try to use a different node in the network as its originator node. However, if the FVV does pass the error check, local workspace 424 transfers the new data file to global workspace 423 via intra-nodal communication link 403. Intra-nodal communication links are Ethernet compatible. Global workspace 423 is a permanent area of segregated memory located within the storage system (not shown) associated with master node 420.

Immediately upon permanently storing the new data file in global workspace 423, an acknowledgment, termed a "success note" is returned by master node 420 to FRS 432 within originator node 430 via network communication link 404. The success note is also in XML and is encoded similarly to that shown in Table I. The receipt of this success note by FRS 432 is its signal that master node 420 has indeed permanently accepted the new data file and that FRS 432 should also permanently accept the new data file. FRS 432 thereupon allows its local workspace 434 to transfer the new data file temporarily stored therein to its global workspace 433 over intra-nodal communication link 405. Global workspace 433 is a permanent area of segregated memory located within the storage system (not shown) associated with originator node 430. The new data file is stored in global workspace 433 for purposes of making it available to be read by and downloaded to the slave nodes of the network. But, before the downloading can take place, existence of the new data file must first be published or broadcast to the network's slave nodes as follows.

FRS 432 "registers" the new data file with its DPS 431 by transferring the FVV, file name, and file IP address of the new data file into FVV publish buffer 435 located within DPS 431. This is accomplished over intra-nodal link 406. FVV publish buffer 435 publishes or broadcasts the FVV value or number as well as corresponding file name and file IP address to all other network nodes via network communication links 407. This publication uses the network's directory provider service where each node, including this originator node, has a complete list of IP addresses of all other network nodes (see incorporated by reference patent applications). This publication or broadcast is again performed in XML.

In a typical network, this broadcast could comprise hundreds of separate communications to hundreds of nodes respectively, but in this simplified example only one slave node and one master node are shown in receipt of the published FVV number (and name and address). The FVV number is a Unique IDentifier (UID). Each FVV is a different number from any of the DDB version numbers of the incorporated by reference patent applications. The FVV numbers and the DDB version numbers are also different categories of numbers. Receipt by master node 420 of the published FVV is not needed by the master node to facilitate the file replication process, and is therefore a redundancy. In view of the fact that only one node out of typically hundreds of nodes can be master node at a given time, this singular redundancy per new data file is a small price to pay for savings in cost, effort and time that results from design simplification because of allowing the redundancy. However, although the master node does not need it, slave node 440 does need the published FVV to enable the replication process to proceed as follows.

DPS 441 of slave node 440 receives the published FVV UID as FVV 443 (and corresponding file name and IP address as well, but not shown in this Fig.). Object observer 442 was observing or was fixated upon a different FVV UID which comprised the object being observed prior to arrival of FVV 443. The different FVV UID which was being observed by observer 442 represents the same data file as the one being updated by user 450, but represents that data file prior to being updated to the new data file by user 450. The prior data file is data file 445 represented by FVV 446 and containing data 446D, and is located in FRS 444 of slave node 440. Immediately upon observing the change from a UID corresponding to FVV 446 to a different UID corresponding to FVV 443, observer 409 signals this change to FRS 444 via intra-nodal communication link 409. FRS 444 then immediately makes a comparison between the two FVV UIDs, FVV 443 versus FVV 446, and notes that the two UIDs are different. Slave node 440, operating through its FRS 444, then sends an XML request to the node (an originator node) which has the IP address corresponding to FVV 443 for a file with a name corresponding to FVV 443, the IP address and file name having been earlier published to slave node 440. This request is thus sent over network communication link 410 to FRS 432 located within originator node 430 for the updated file corresponding to FVV 443. This request is received in global workspace 433 of FRS 432. Global workspace 433 is storing the updated file pursuant to its receipt of such file from local workspace 434 as earlier-described. If this file replication process is operating properly, in response to the XML request for the new file, global workspace 433 allows the new file to be read and downloaded to FRS 444 in slave node 440, thereby replacing old data 446D with new data and replacing old FVV 446 with new FVV 443. For the situation where a new file is introduced into the network for the first time, the observer (or alternatively a different observer) notes the change from no file version variable to some file version variable and the operation is otherwise identical to that discussed above.

With respect to the topic of proper operation of the file replication process, there are a variety of possible failure modes including but not limited to the following examples:

One mode may involve a network node (master, originator or slave) which might become inoperable at any time. A network cord to that node could become unplugged if, for example, someone tripped over it, etc. This could cause internal failure in that node. Depending on which node failed and the precise time of its failure relative to the time of dropping a new file on an originator node, this failure mode might result in return of an error flag to the GUI user. If the master node fails or is otherwise unavailable, no new or updated files can be dropped by any user until the master node is made operative or until another node is promoted to master status as a substitute for the original master node.

Another mode involves an unreachable master node. In this instance, when the originator node "pushes" the new file to the master node but where the backup operation is not completed, the originator node's file replication service is shut off until the master becomes reachable (or until another master is selected).

Another mode relates to the master node's error checking on the FVV which results in a bogus or unreadable FVV. An error flag is returned to GUI as earlier described.

Another mode involves a failed registration of the new file's FVV, file name, and IP address by the originator node's FRS into its DPS's FVV publish buffer. This disallows publishing of the new FVV to any of the slave nodes in the network.

Another mode is that the new file's FVV has been published by the originator node but the originator node cannot be reached by any of the slave nodes to download the new data file because of a failed network link to the originator node, or a failed originator node itself.

These examples and virtually any other foreseeable failure mode can be handled by the backup master node and/or the two synching threads.

When the master node is called upon to serve in a backup capacity, slave node 440 attempts to obtain the new file from the master node. The new file was stored as backup on global workspace 423 in master node 420, as earlier described. If that storage was not accomplished, the replication process would not have advanced beyond that point. Slave node 440 knows the IP address of its master node as a result of normal operation of its DPS 441 as described in the incorporated by reference patent applications. Slave node 440 now utilizes its FRS 444 with respect to the master node in a manner similar to how it was used in attempting to download the new file from the originator node, to obtain the new file by way of network communication link 411 from global workspace 423 in the master node. If this attempt by slave node 440 to obtain the new data file from master node 420 fails for any reason, there are two syncing threads that are periodically applied to the slave node, at approximately five minute intervals but not necessarily coincidentally or at the same frequency. These syncing threads are applied whether or not handling of a failure mode is needed. This ensures that all data files are properly updated for all slave nodes within a time period not to exceed the sum of those two intervals, or approximately ten minutes in this example. These syncing threads, one of which involves disk(s) 460 via network communication link 461, shall be described in more detail in connection with FIGS. 8 and 9 hereinbelow.

One possible alternative embodiment of the present invention is to have each of the slave nodes seek the updated file from the master node instead of from its originator node, but this embodiment may have drawbacks. First of all, since the master node is acting as backup then such backup protection may be foreclosed if the master node is also acting as the primary source of the new file. Secondly, a network load imbalance may result. If a number of originator nodes are serving a number of users, and each user drops new files on its originator node at approximately the same time, each slave node in the network shall attempt to download all of those new or updated files from only the master node. The master node's capacity to broadcast each new FVV and/or to permit downloading of each new data file from its global workspace may be overwhelmed. A load balancing effect is achieved with the earlier-described embodiment wherein each originator node, upon which a new file has been dropped, serves as the primary source of that new file for the network's slave nodes. This spreads the broadcasting and downloading over all originator nodes thereby achieving load balancing, rather than forcing all those operations upon a single master node and creating a load imbalance. In a similar vein, the master node can also be made the originator node by a user, but such an arrangement eliminates the useful backup service otherwise provided by the master node. However, other alternative embodiments which are advantageous are discussed hereinbelow.

Figure 5:
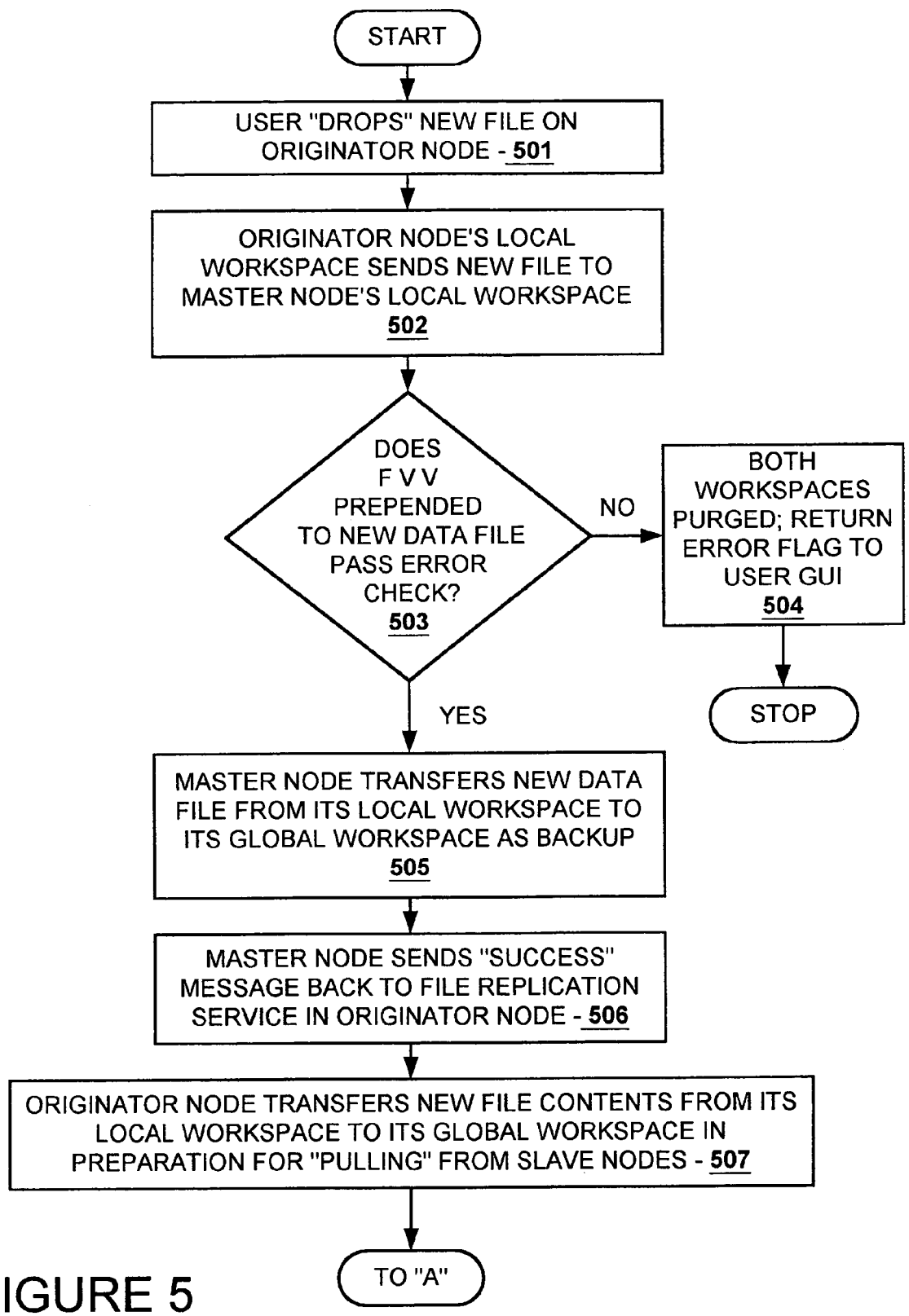
FIG. 5 is a flowchart depicting a first portion of an algorithm implemented by operation of the present invention.
Figure 6:
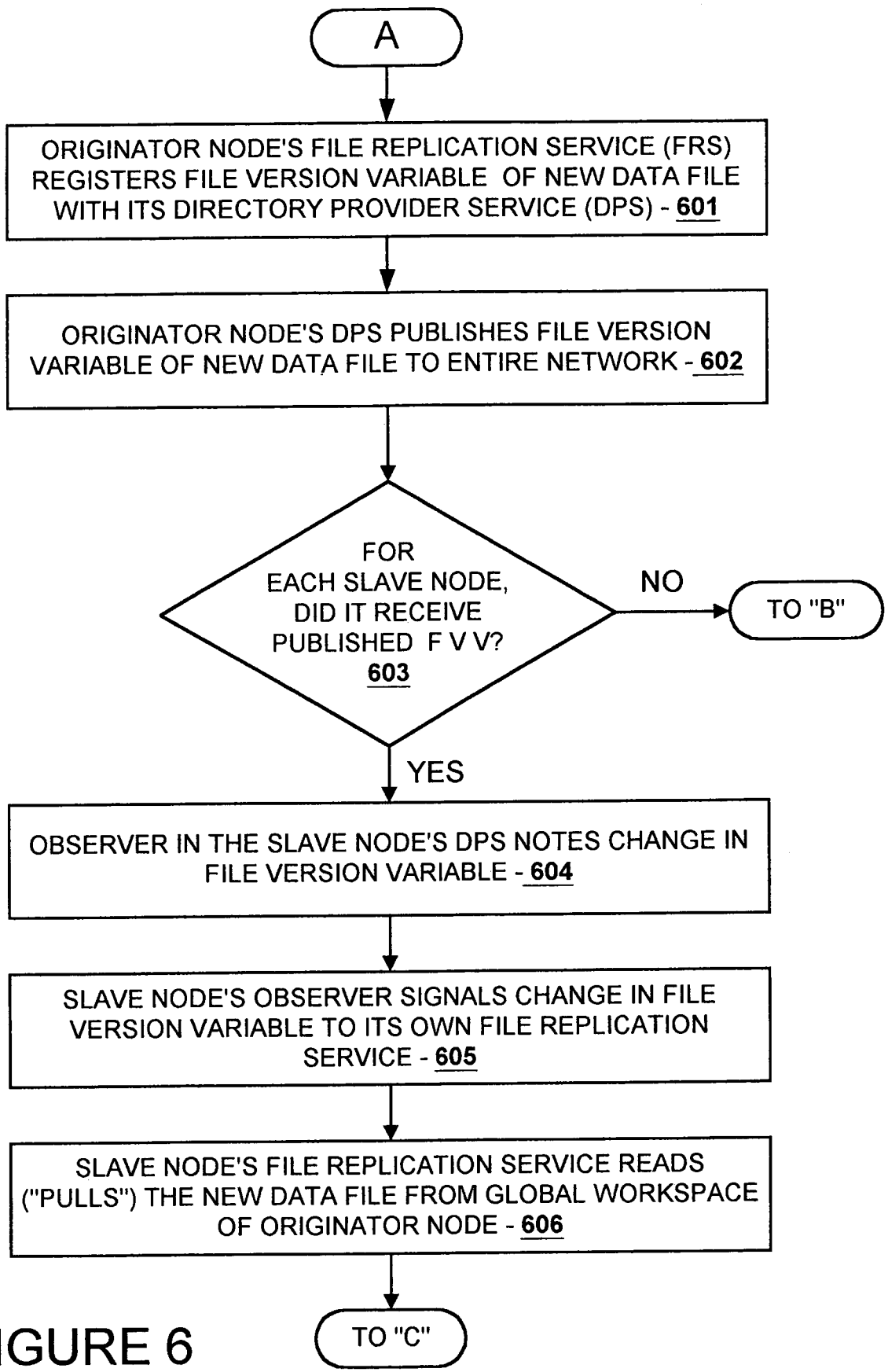
FIG. 6 is a flowchart connected from FIG. 5 depicting a second portion of the algorithm of FIG. 5 implemented by operation of the present invention.
Figure 7:
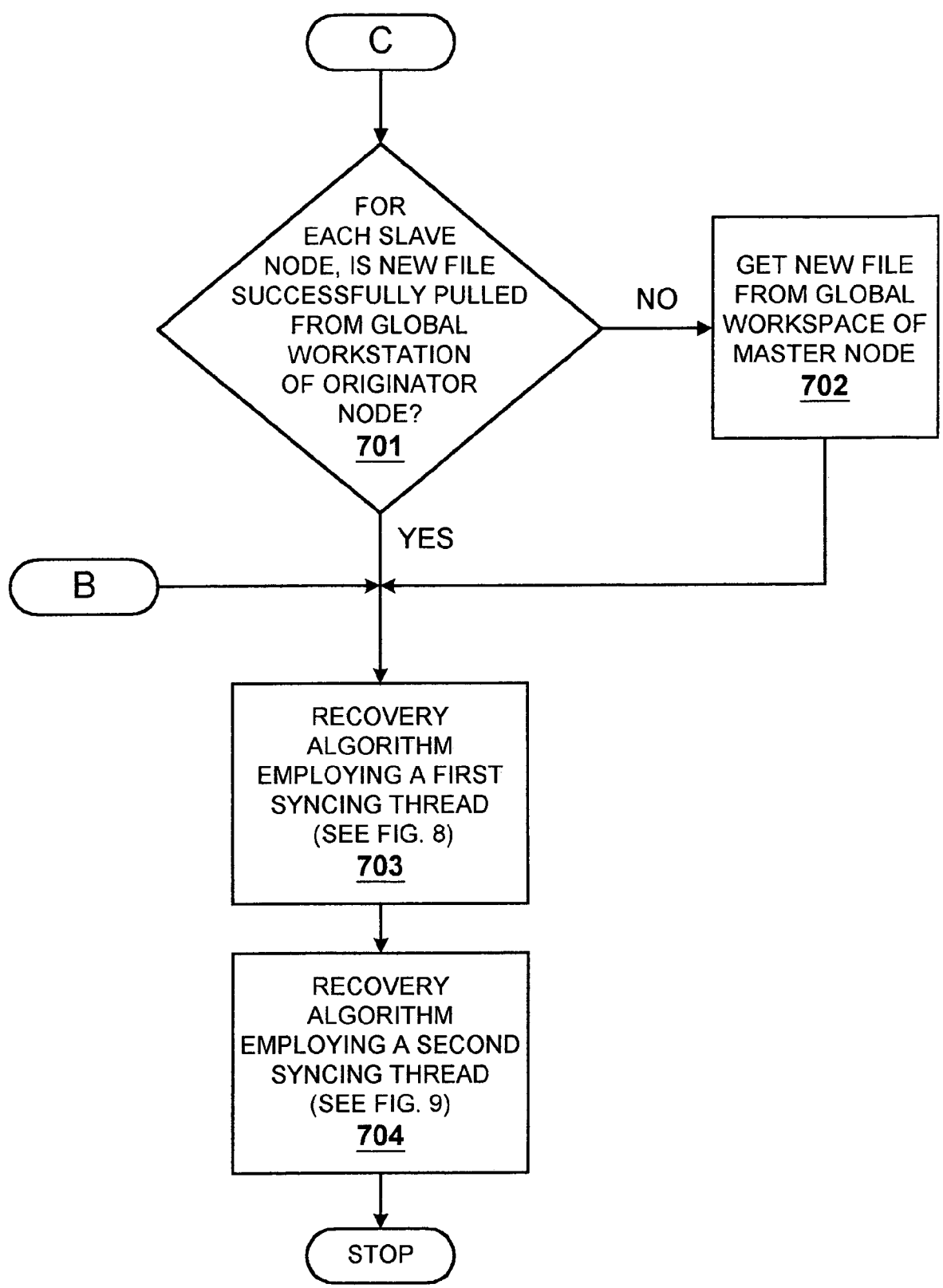
FIG. 7 is a flowchart connected from FIG. 6 depicting a third and final portion of the algorithm of FIG. 6 implemented by operation of the present invention.

FIGS. 5, 6, & 7—Interconnected Flowcharts

FIG. 5 is a flowchart depicting a first portion of an algorithm implemented by operation of the present invention. In block 501 a user, such as any user of FIG. 1 or GUI user 450 of FIG. 4, drops a new file on a network node, thus making that node an originator node. In FIG. 4, node 430 becomes the originator node when the new file is received in local workspace 434. The algorithmic process moves to block 502 wherein the originator node's local workspace sends the new file to the master node's local workspace, as, for example, receipt of the new file into local workspace 424. The algorithmic process proceeds to decision block 503 wherein the query is made: does the file version variable representing or identifying the data in the new data file pass an error check performed by the master node? On the one hand, if "no", the algorithmic process moves to block 504 where both of the local workspaces in the originator and master nodes are purged, an error flag is returned to the user's GUI, and the algorithmic process stops. On the other hand, if "yes", the algorithmic process moves to block 505 wherein the master node transfers the new data file from its local workspace to its global workspace (423 in FIG. 4) for subsequent backup support to a slave node if needed. The algorithmic process moves next to block 506 where a "success" message is returned by the file replication service in the master node to the file replication service in the originator node, thereby advising the originator node that the new file's FVV has passed the master node's error check and that the master node has stored the new file including at least its name, FVV and data load into its more-permanent global workspace. In block 507, only after the originator node receives the success note does it allow transfer of the new file from its local workspace to its global workspace (433 in FIG. 4) in preparation for eventual "pulling" from, or reading by, the network's slave nodes. The process continues to the "A" tab in FIG. 6.

In block 601 of FIG. 6, the originator node's file replication service registers the file version variable and file name with its directory provider service which includes the originator node's IP address in the registration. (As detailed in the incorporated by reference patent applications, part of the responsibility of the directory provider service is to keep track of all network node IP addresses including its own address.) This registration is retained in a buffer such as FVV publish buffer 435 in FIG. 4. In the next step of the algorithm in block 602, the originator node's directory provider service broadcasts or publishes the registered file version variable along with the file name and originator node's IP address to the entire network including master and all slave nodes. The process moves next to decision block 603 wherein the query is made: for each slave node, did it receive the published file version variable? On the one hand, if "no", then for each node for which the published file was not received (non-updated nodes) the process moves to tab "B" in FIG. 7. These non-updated nodes remain in that state until syncing threads in special recovery algorithms are applied to them in steps 703 and 704 of FIG. 7. These recovery algorithms are detailed in FIGS. 8 and 9 and are discussed hereinbelow. But, on the other hand, if "yes", then for each slave node that did receive the published file the algorithmic process moves to block 604. In block 604 an object observer in the slave node's directory provider service is fixated upon the file version variable associated with the old data file corresponding to the updated data file prior to its being updated by the user. The object observer notes a change in the file version variable which is "notice" to the slave node's directory provider service that the file itself (data load) has changed or has been updated. (The same result obtains if the user introduces a data file that had no prior incarnation as contrasted with the user "updating" an old data file because in the former case there is an observed FVV change from no FVV value to a finite FVV value. In an alternative embodiment, to handle new file additions, a separate "new file" object observer may be used, obtaining the same result.) The algorithmic process then moves to block 605 wherein the slave node's observer signals the change to its own file replication service to allow it to obtain the new file. This corresponds to observer 442 observing FVV 443 as an updated file version variable received by way of publication from originator 430, and sending the change signal over link 409 in FIG. 4 to FRS 444. The algorithmic process then moves to block 606 wherein the slave node's file replication service reads or pulls the new data file from the global workspace of the originator node, the IP address of which is known to the file replication service since it was received along with the updated file version variable and file name in the originator's publication thereof. The process moves to tab "C" in FIG. 7.

In FIG. 7, decision block 701 presents the query: for each slave node, is the new file successfully pulled from the global workstation of the originator node? On the one hand, if "no", the process moves to block 702 wherein for each slave node for which the new file was not successfully read from the global workspace of the originator node, the new file is obtained from the global workspace of the master node. In a network of multiple slave nodes, most may have operative links to the originator node but a few may not, whereby the new file might not be obtainable by all network nodes from the originator node. Since the master node contains a backup copy of the updated file, it can be obtained by a slave node that could not obtain it from the originator node. But, it is possible that the backup operation in block 702 also might fail for certain nodes under certain conditions—again, a bad link from slave to master node may be a problem. However, any such node failing in its operation of block 702, and which therefore failed twice in its attempt to get an updated file, first from its originator node and then from its master node, is given yet another opportunity to obtain this updated file. This opportunity is presented by way of operations specified in blocks 703 and 704 to be discussed further hereinbelow. However, before such discussion is undertaken, consider the other result from query block 701. On the other hand, if "yes", then the process moves from block 701 directly to blocks 703 and 704. Thus, regardless of success or failure by any particular slave node in its attempt to read a new file from its originator node, the algorithmic process converges at this point for all nodes. In block 703 a first syncing thread is applied to all nodes in the network; and, in block 704, a second syncing thread is likewise applied to all nodes. These two syncing threads comprise a recovery algorithm which is repetitively and periodically applied to all nodes to further ensure synchronization (that all slave nodes have the latest network files if not obtained by other operation of the network's file replication service), and are detailed in FIGS. 8 and 9 as follows.

FIGS. 8 & 9—Recovery Algorithm Flowcharts

As previously described, there can be a number of reasons for a network to become unsynchronized whereby any one or more nodes in the network contains data files that are not current. A list of failure modes or scenarios was provided above which is by no means a complete list. And those failure modes need not occur in the alternative, but can occur together. Accordingly, despite effective operation of the file replication service described thus far, by which files are replicated virtually instantaneously with their insertion into the network, to further ensure that every node in the network, does not run in an unsynchronized mode for longer than a short predetermined interval because of various permutations and combinations of failure scenarios that might occur, syncing threads of FIGS. 8 and 9 are included as part of the file replication service. In FIG. 8, a synchronization is obtained between the directory provider service and the file replication service for each node in the network. In FIG. 9 a synchronization is obtained between the directory provider service (acting through the file replication service) and data stored on the storage disk(s) for each node in the network. These two syncing threads, in a preferred embodiment, repetitively operate at approximately five minute intervals. However, the two threads need not operate simultaneously—they can be offset from each other, need not run at the same or similar intervals, and can be set to run at shorter or longer intervals than five minutes.

In the incorporated by reference patent applications, a polling feature was discussed in detail with regard to version numbers associated with only the directory database (DDB) portion of the directory provider service. However, the directory provider service handles two kinds of data: IP address data associated with DDB and FVV data associated with data files, but not the data loads per se identified by those FVV numbers. Accordingly, there are other version numbers associated with the directory provider service, DPS version numbers, which take into account both the DDB and the FVV. Therefore, the polling feature described in the incorporated by reference patent applications, which is limited to IP address data, operates independently of the syncing thread (polling) of FIG. 8.

In FIG. 8, with reference to block 801, for each slave node there is periodic polling by the slave node's directory provider service of its master node's directory provider service to determine if the slave node's directory provider service version number matches the master node's directory provider service version number. (In FIG. 8, each slave node is intended to mean "participating node" in the network or configuration which is as defined in the incorporated by reference patent applications as any node in the network or configuration other than the master node.) The algorithmic process moves from block 801 to query block 802 where the query is made: do the master and slave directory provider service version numbers match? If "yes", the algorithmic process stops because the match indicates that both the DDB version numbers match properly (implying that the network is fully apprised of the whereabouts of all of its network nodes) and the FVV numbers match properly (implying that the all of the network's data files are up to date). But, if "no", then the algorithmic process continues in decision block 803 where the query is posed: is the mismatch in the directory provider service version numbers due to DDB version number mismatch only?

On the one hand, if the answer to the query in decision block 803 is "yes", the algorithmic process moves to block 806 wherein IP address replication occurs in each network node in accordance with the incorporated by reference patent applications, after which the algorithmic process stops. On the other hand, if the answer to the query in block 803 is "no", the algorithmic process moves to another decision block, block 804, wherein another query is posed: is the mismatch in the directory provider service version numbers due to the file replication service's FVV mismatch only?

On the one hand, if the answer to the query in decision block 804 is "yes", the algorithmic process moves to block 807 wherein for each mismatched file version variable on that slave node, the slave node's file replication service obtains a new file version variable and its associated new file from the global workspace in the file replication service of the master node. Again, the master node is serving in its backup capacity relative to the file replication service, after which the algorithmic process stops. On the other hand, if the answer is "no" this means that the mismatch must be due to a combination of DDB version number mismatch and file version variable mismatch. The algorithmic process moves to block 805 wherein the actions of both blocks 806 and 807 are performed as a combined solution to the combined mismatch, after which the algorithmic process stops.

In FIG. 9, with reference to block 900, for each node in the network including master node, originator node and all slave nodes, through its respective file replication service, the contents stored on the node's physical storage disk(s) are periodically polled by comparing each disk-stored file version variable with its respective file version variable stored in the node's directory provider service. This comparison is made periodically for each file version variable on each disk of each node in the network, the period being typically about five minutes between polls. In FIG. 4, storage disk(s) 460 is shown operatively coupled to slave node 440. For example, FVV 443 in DPS 441 is compared with its corresponding FVV in Disk 460. The other nodes in that figure also have storage disk(s) operatively coupled thereto, but are not shown for purposes of enhancing clarity of presentation. It should be understood that other structure and functionality may be necessary for the network of FIG. 4 to function as a storage network, such as storage processors, etc., which are also not shown for the same reasons. The algorithmic process moves next to decision block 901 wherein the query is posed: for each comparison is there a file version variable match? If "yes" the data files associated with those matching file version variables also match and the algorithmic process concludes for that particular file version variable on that particular disk for that particular node in the network. But, if "no", then the algorithmic process moves to decision block 902 wherein the query is posed: did mismatch occur on the master node to disk(s) combination or on a slave node to disk(s) combination. (Again, the term slave node in this instance includes the originator node to allow all nodes to be polled.)

If the mismatch is on a slave node, the algorithmic process moves to yet another decision block, block 903, wherein the query is posed: is mismatch due to missing file(s) from, or due to extra file(s) on, this particular slave node's physical disks? If due to a missing file(s) from the disk, the process moves to block 906 wherein the missing file(s) is retrieved from the originator node associated with that missing file (the originator node being that node through which the missing file was first introduced into the network), or retrieved from the master node whereupon the algorithmic process stops. This retrieval is performed by the particular slave node's file replication service in the manner described hereinabove. But, if due to an extra file(s) on the disk, in block 905 the extra file is ignored and deleted, whereupon the algorithmic process stops.

However, if the mismatch is on the master node, the algorithmic process behaves quite differently. The process moves to yet another decision block, block 904 wherein virtually the same query posed in block 903 is again asked: is mismatch due to missing file(s) from or extra file(s) on this (master) node's physical disk(s)? The response to this query is markedly different from the response received earlier for the slave node. If due to a missing file(s) from the disk, the process moves to block 907 wherein each mismatched file's FVV number and any associated data is removed from the master node's directory provider service, the associated file is flushed, and the algorithmic process stops. The actual information stored on the disk(s) of the master node is the prevailing information in the network. Recall that the master node holds the most trusted copy of all network data, including IP address data (DDB version numbers) and data files (file version variables and data loads). And the master node's disk(s) hold the most trusted copy of the master node's information. Continuing with the algorithm, by contrast, if the mismatch is due to an extra file(s) on the master node's disk(s), each extra file's file version variable is added to the master node's directory provider service, the associated file is maintained on disk, and the algorithmic process stops.

Alternative Embodiments

In a first alternative embodiment of the present invention, rather than have only the master node hold a backup copy of the new file, additional nodes can also be used in a backup capacity. As each slave node acquires the updated file from the originator or master node as earlier described, that slave node can serve as another source of backup since it now has the new file. After that slave node acquires the new file, its directory provider service can secondarily publish (re-publish) the new file's FVV from its global workspace. There may be an additional tag attached to that secondary publication advising that it is not the originator or master node but it can be used by yet other slave nodes in a further backup capacity, but only if the both the originator and master nodes are not available to serve up the new file. Or, it can be available for that purpose even if originator and master nodes are available and operative. This procedure can be cumulative in the sense that as each additional slave node acquires the new file from the originator, master, or other prior "backup-slave" node, it can join the ranks of backup-slave nodes by also re-publishing the new file's FVV thereby advising that it too can be used for backup under the same conditions as prior backup slave nodes. This may be a complicated algorithm, but is one that is implementable and offers a further reliability advantage of having more than two sources of the new data file.

A second alternative embodiment is an enhancement primarily for large files. Embodiments of the present invention currently can send file content via Common Information Model/eXtensible Markup Langage (CIM/XML). Because CIM/XML cannot handle sending and receiving binary content, 64 bit encoding is used. The content thus needs to be "chunked" (chunk size to be determined) as all of the content must be parsed by the remote server before processing the request and it is undesirable to read and maintain all of the content in memory. A specialized use of CIM/XML may achieve the same result as the following alternative embodiment, such as, for example, the server processing the request and not parsing it entirely, but this requires specialized code in the generic request path. The alternative embodiment is to use a "PUT" command with Hyper Text Transfer Protocol (HTTP), the combination termed "HTTP PUT", to deliver the binary content to the server. The HTTP PUT command allows one to use one of the services of the Common Information Model Object Manager (CIMOM) to bypass the parser completely. The server would post the large file to the CIMOM which would save the large file in a scratch space. Then, the server would send a quick XML note to tell the client where the file came from and what it should be saved as. This eliminates the need to encode the binary content, and the content will automatically be chunked by Transmission Control Protocol/Internet Protocol (TCP/IP). Each chunk can then be read and written directly to disk as it is received. Information regarding length and content of the file can be placed in a header that resides at the beginning of the file. This may include the name, version, length, and a hash value representing the file's checksum. When the transfer and all checks on the file are complete, a status can be returned via the HTTP PUT response to the client. Non-standard http headers can be included as well to indicate the operation's status if a simple status is not sufficient. The PUT may also include security information, such as a message digest security algorithm, for example, an MD2 message digest, which can be authenticated by the server.

When the file is transferred, the webserver or CIMOM must have a way of knowing that the file is intended to be replicated in accordance with the principles of the present invention. This can be achieved through the use of a Uniform Resource Identifier (URI) which indicates that the HTTP PUT operation is intended for a specialized resource on the server (i.e. file replication or "persistence"). As an example, the URI CIMOM is used to indicate that POST requests are intended for the CIMOM component of the webserver, POST being another command similar to PUT.

The steps for replicating the file would then be as follows:
1. Client sends the file using HTTP POST. The URI that is specified is known to both client and server as an indicator to the server that this PUT request is intended to be replicated in accordance with the principles of the present invention.
2. Server receives the pieces and places the file into file replication service storage.
3. The server checks validity of the header, then uses that validity information to both ensure that the entire file transferred and to name the file appropriately.
4. The webserver/CIMOM then makes an internal request to the file replication service, thereby advising a file has arrived to be processed.
5. The module processes the request and indicates successful or failed delivery back to the client.

The present invention may thus be embodied in many different forms, including, but not limited to, computer program logic for use with any kind of processor, programmable logic for use with any kind of programmable logic device, discrete components, integrated circuitry including application specific integrated circuits (ASICs), or any other means including any combination thereof. Computer program logic implementing all or part of the functionality described herein may be embodied in various forms, including, but not limited to, source code form, computer executable form, and various intermediate forms (e.g. forms generated by an assembler, compiler, linker, or locator.) Source code may include a series of computer program instructions implemented in any of various programming languages for use with various operating systems or operating environments. The source code may define and use various data structures and communication messages. The source code may be in computer executable form, or it may be in a form convertible into computer executable form. The computer program may be fixed in any form either permanently or transitorily in a tangible storage medium, such as a semiconductor memory device, a magnetic memory device, an optical memory device, a PC card, or other memory device. The computer program may be fixed in any form in a signal that is transmittable to a computer using any of various communication technologies including, but not limited to, analog, digital, optical, wireless, networking, and internetworking technologies. The computer program may be distributed in any form as a removable storage medium with accompanying printed or electronic documentation, preloaded with a computer system (e.g. on system ROM or fixed disk), or distributed from a server or electronic bulletin board over the communication system (e.g., the Internet or World Wide Web).

The present embodiments are to be considered in all respects as illustrative and not restrictive. The scope of the invention is indicated by the appended claims rather than by the foregoing description, and all changes which come within the meaning and range of equivalency of the claims are therefore intended to be embraced therein.

What is claimed is:

1. In a computer network having a plurality of nodes communicatively linked to users of said network, a file replication system comprising:
    means for establishing one of said nodes as a master node;
    means, distributed on each of said nodes, for receiving at least one new or updated file from at least one of said users in any one of said nodes except for said master node; and,
    means, distributed throughout said plurality of nodes and responsive to operation of said receiving means for replicating said at least one new or updated file in all other of said nodes wherein said replicating means includes additional replication means for replicating said at least one new or updated file in all other of said nodes in a manner that is network-topology independent.

2. The system of claim 1 and wherein said replicating means includes:
    additional replication means for replicating said at least one new or updated file in all other of said nodes in a manner that avoids a single point of failure.

3. The system of claim 1 and wherein said any one of said nodes except for said master node, which has received said at least one new or updated file from said at least one of said users, is an originator node.

4. The system of claim 3 and wherein said replicating means further comprises:
    means for establishing said plurality of nodes except for both said originator node and said master node as slave nodes;
    means for storing said at least one new or updated file on said master node as a backup file; and,
    in each of said slave nodes, means for updating a particular file corresponding to said at least one new or updated file.

5. The system of claim 4 and further comprising:
    means, included within said master node, for communicating both creation of said backup file to said originator node and availability of said backup file to said slave nodes.

6. The system of claim 5 and further comprising:
    said originator node including means, responsive to operation of said communicating means, for publishing a representation of said at least one new or updated file to said slave nodes; and
    means, within each of said slave nodes and responsive to operation of said publishing means, for commanding its respective node to obtain said at least one new or updated file from said originator node.

7. The system of claim 5 and wherein operation of said communicating means communicating said creation of said backup file to said originator node comprises a success note.

8. The system of claim 6 and further comprising:
said originator node including means for establishing a new or updated file version variable as said representation of said file; and
said publishing means includes means for publishing said new or updated file version variable to said slave nodes.

9. The system of claim 8 and further comprising:
said replicating means including means for establishing a particular new or updated file version variable corresponding to said particular file;
object observer means, in said each of said slave nodes, for observing change from said particular new or updated file version variable to said new or updated file version variable; and,
said commanding means including means, responsive to operation of said object observer means, for downloading said new or updated file from said originator node into said particular file in said each of said slave nodes.

10. The system of claim 4 and wherein said replicating means comprises:
local workspace means for receiving said new or updated file in said originator node; and,
global workspace means, operatively coupled to said local workspace means, for receiving said new or updated file from said local workspace means in preparation to download said new or updated file to any of said slave nodes upon request from said any of said slave nodes.

11. The system of claim 10 and wherein said replicating means further comprises:
at least one data file including a data word with its corresponding file version variable.

12. The system of claim 10 and wherein said local workspace means further includes:
multiple source means for receiving said new or updated file from a new-data-supplier group consisting of a network user, a security provider, and other providers.

13. The system of claim 12 and wherein said multiple source receiving means includes additional means for receiving additional new or updated files from said new-data-supplier group.

14. The system of claim 1 and wherein said receiving means is further capable of receiving multiple new or updated files, each of said files being received from a different network user.

15. The system of claim 6 further comprising:
means, responsive to operation of said commanding means not obtaining said new or updated file from said originator node, for further commanding said respective node to obtain said backup file from said master node.

16. A computer program product for use in a computer network having a plurality of nodes communicatively linked to users of said network, said computer program product including a tangible computer usable medium having computer readable program code thereon for file replication, said program code comprising:
program code for establishing one of said nodes as a master node;
program code, distributed on each of said nodes, for receiving at least one new or updated file from at least one of said users in any one of said nodes except for said master node; and,
program code, distributed throughout said plurality of nodes and responsive to execution of said receiving program code, for replicating said at least one new or updated file in all other of said nodes wherein said replicating program code includes additional replication program code for replicating said at least one new or updated file in all other of said nodes in a manner that is network-topology independent.

17. The computer program product of claim 16 and wherein said replicating program code includes:
additional replication program code for replicating said at least one new or updated file in all other of said nodes in a manner that avoids a single point of failure.

18. The computer program product of claim 16 and wherein said any one of said nodes except for said master node, which has received said at least one new or updated file from said at least one of said users, is an originator node.

19. The computer program product of claim 18 and wherein said replicating program code further comprises:
program code for establishing said plurality of nodes except for both said originator node and said master node as slave nodes;
program code for storing said at least one new or updated file on said master node as a backup file; and,
in each of said slave nodes, program code for updating a particular file corresponding to said at least one new or updated file.

20. The computer program product of claim 19 and further comprising:
program code, included within said master node, for communicating both creation of said backup file to said originator node and availability of said backup file to said slave nodes.

21. The computer program product of claim 20 and further comprising:
said originator node including program code, responsive to operation of said communicating program code, for publishing a representation of said at least one new or updated file to said slave nodes; and
program code, within each of said slave nodes and responsive to operation of said publishing program code, for commanding its respective node to obtain said at least one new or updated file from said originator node.

22. The computer program product of claim 20 and wherein operation of said communicating program code communicating said creation of said backup file to said originator node comprises a success note.

23. The computer program product of claim 21 and further comprising:
said originator node including program code for establishing a new or updated file version variable as said representation of said updated file; and
said publishing program code includes program code for publishing said new or updated file version variable to said slave nodes.

24. The computer program product of claim 23 and further comprising:
said replicating program code including program code for establishing a particular new or updated file version variable corresponding to said particular file;
object observer program code, in said each of said slave nodes, for observing change from said particular new or updated file version variable to said new or updated file version variable; and,
said commanding program code including program code, responsive to operation of said object observer program code, for downloading said new or updated file from said originator node into said particular file in said each of said slave nodes.

25. The computer program product of claim 19 and wherein said replicating program code comprises:
local workspace program code for receiving said new or updated file in said originator node; and, global workspace program code, operatively coupled to said local workspace program code, for receiving said new or updated file from said local workspace program code in preparation to download said new or updated file to any of said slave nodes upon request from said any of said slave nodes.

26. The computer program product of claim 25 and wherein said replicating program code further comprises:
at least one data file including a data word with its corresponding file version variable.

27. The computer program product of claim 25 and wherein said local workspace program code further includes:
multiple source program code for receiving said new or updated file from a new-data-supplier group consisting of a network user, a security provider, and other providers.

28. The computer program product of claim 27 and wherein said multiple source receiving program code includes additional program code for receiving additional new or updated files from said new-data-supplier group.

29. The computer program product of claim 16 and wherein said receiving program code is further capable of receiving multiple new or updated files, each of said files being received from a different network user.

30. The computer program product of claim 21 further comprising:
program code, responsive to operation of said commanding program code not obtaining said new or updated file from said originator node, for further commanding said respective node to obtain said backup file from said master node.

31. In a computer network having a plurality of nodes communicatively linked to users of said network, a file replication method executed by a computer, said method comprising:
establishing one of said nodes as a master node;
arranging for receipt of at least one new or updated file from at least one of said users in any one of said nodes except for said master node;
receiving said file in a certain one of said nodes; and, in response to said receiving, replicating said at least one new or updated file in all other of said nodes wherein said replicating includes replicating said at least one new or updated file in all other of said nodes in a manner that is network-topology independent.

32. The method of claim 31 and wherein said replicating program code includes:
replicating said at least one new or updated file in all other of said nodes in a manner that avoids a single point of failure.

33. The method of claim 31 and wherein said any one of said nodes except for said master node, which has received said at least one new or updated file from said at least one of said users, is an originator node.

34. The method of claim 33 further comprising:
establishing said plurality of nodes except for both said originator node and said master node as slave nodes;
storing said at least one new or updated file on said master node as a backup file; and,
in each of said slave nodes, updating a particular file corresponding to said at least one new or updated file.

35. The method of claim 34 further comprising:
communicating both creation of said backup file to said originator node and availability of said backup file to said slave nodes.

36. The method of claim 35 further comprising:
publishing a representation of said at least one new or updated file to said slave nodes; and
within each of said slave nodes, commanding its respective node to obtain said at least one new or updated file from said originator node.

37. The method of claim 35 and wherein communicating said creation of said backup file to said originator node comprises a success note.

38. The method of claim 36 further comprising:
establishing a new or updated file version variable as said representation of said updated file; and
publishing said new or updated file version variable to said slave nodes.

39. The method of claim 38 further comprising:
establishing a particular new or updated file version variable corresponding to said particular file;
observing change from said particular new or updated file version variable to said updated file version variable; and,
downloading said new or updated file from said originator node into said particular file in said each of said slave nodes.

40. The method of claim 34 further comprising:
receiving said new or updated file in local workspace of said originator node; and,
receiving said new or updated file into global workspace from said local workspace in preparation to download said new or updated file to any of said slave nodes upon request from said any of said slave nodes.

41. The method of claim 40 and wherein said replicating further comprises:
including a data word with its corresponding file version variable in at least one data file.

42. The method of claim 40 further comprising:
receiving said new or updated file from a new-data-supplier group consisting of a network user, a security provider, and other providers.

43. The method of claim 42 further comprising:
receiving additional new or updated files from said new-data-supplier group.

44. The method of claim 31 further comprising:
receiving multiple new or updated files, each of said files being received from a different network user.

45. The method of claim 36 further comprising:
further commanding said respective node to obtain said new or backup file from said master node responsive to said commanding not obtaining said updated file from said originator node.

46. File replication apparatus for use in a computer network having a plurality of nodes communicatively linked to users of said network, said apparatus comprising:
master node establishing apparatus for establishing one of said nodes as master node;
first file apparatus, distributed on each of said nodes, configured to receive at least one new or updated file from at least one of said users in any one of said nodes except for said master node; and,
second file apparatus, distributed throughout said plurality of nodes and responsive to operation of said first file apparatus receiving said at least one new or updated file in a certain one of said nodes, to replicate said at least one new or updated file in all other of said nodes in a manner that is network-topology independent and avoids a single point of failure.

* * * * *